Figure 1:
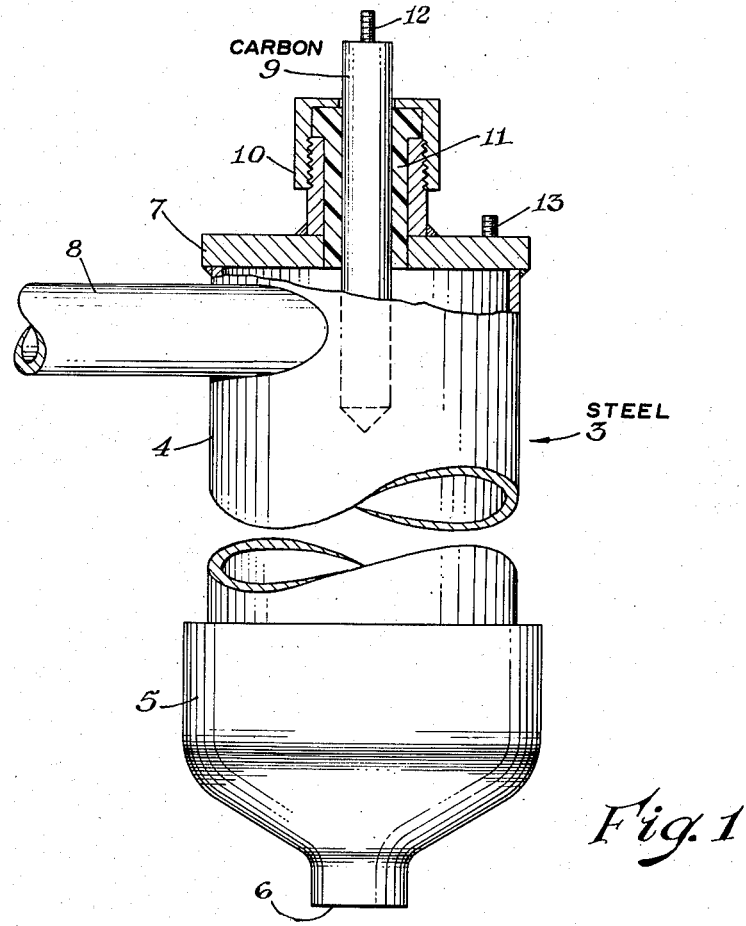

Oct. 15, 1957 W. G. DUDLEY ET AL 2,809,928
METHOD AND APPARATUS FOR DETECTING THE MOISTURE
CONTENT OF LIQUID HALOHYDROCARBONS
Filed Jan. 29, 1953

INVENTORS
William G. Dudley
Porter Hart
Oliver Osborn

BY Griswold & Burdick
ATTORNEYS

+ # 2,809,928

METHOD AND APPARATUS FOR DETECTING THE MOISTURE CONTENT OF LIQUID HALOHYDROCARBONS

William G. Dudley, Porter Hart, and Oliver Osborn, Lake Jackson, Tex., assignors to The Dow Chemical Company, Midland, Mich., a corporation of Delaware Application January 29, 1953, Serial No. 334,016

1 Claim. (Cl. 204—1)

This invention comprises a method for determining the moisture content of liquid halohydrocarbons, and an apparatus for carrying out such moisture determinations.

Thoroughly dry liquid halohydrocarbons, even though containing anhydrous hydrogen halide, do not corrode steel equipment with which they are in contact. However, in the presence of moisture, halohydrocarbons containing hydrogen halide become corrosive to steel. It is therefore desirable to remove water, e. g. by separative distillation, from hydrogen halide-containing halohydrocarbons prior to bringing them into contact with mild steel equipment and storage vessels. To remove water continuously and effectively from these halohydrocarbons so as to lower their moisture content below a certain predetermined value requires a means for rapidly and continuously determining moisture content. No such means is known which is readily applicable to hydrogen halide-containing halohydrocarbons.

It is therefore the principal object of this invention to provide a method and apparatus for determining the moisture content of a liquid halohydrocarbon containing hydrogen halide. A further object is to provide an apparatus for rapidly and continuously detecting the presence of moisture in a stream of such a halohydrocarbon in excess of some predetermined value. Another object is to provide a self-cleaning electrolytic cell suitable for such moisture determinations.

The invention is based on the discovery that when an iron electrode and a carbon electrode are immersed in a moist liquid halohydrocarbon containing hydrogen halide, there is developed an electrical potential the magnitude of which is a function of the moisture content of the halohydrocarbon. Since the corrosiveness of hydrogen halide-containing halohydrocarbons toward metals is dependent on their moisture content, the electrical potential also is a measure of this corrosiveness.

In a preferred way of utilizing this discovery, the moisture content and corrosiveness of a liquid halohydrocarbon which contains hydrogen halide are determined by passing a stream of the liquid through an electrolytic cell vessel into simultaneous contact with an iron electrode and a carbon electrode while measuring the potential developed between these electrodes. The electrical potential so developed renders the iron anodic and the carbon cathodic.

In practice, the two electrodes may be inserted into a suitable cell vessel, or the vessel itself may constitute one of the electrodes. For instance, the vessel may be formed with inner walls of iron, e. g. mild steel, and have a carbon electrode electrically insulated from the walls of the vessel projecting into it in position to contact the liquid halohydrocarbon contained therein. Since the responsiveness of the cell potential to changes in moisture content is decreased by corrosion products collecting at either electrode, it is advantageous to design the cell vessel to be self-cleaning, as will be described.

Figure 2:
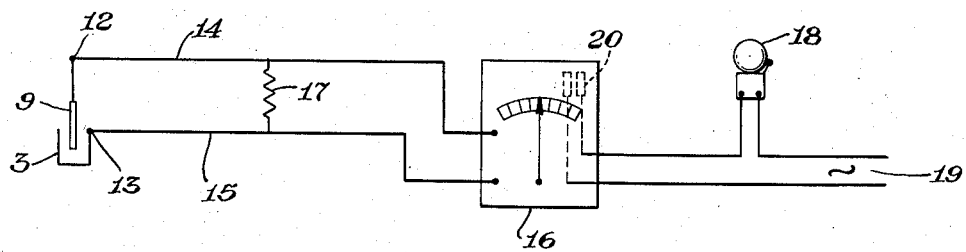

The method and apparatus of the present invention will best be understood by reference to the accompanying drawing wherein:

Fig. 1 is an elevational view, partially in section, of the preferred embodiment of the self-cleaning electrolytic cell, and Fig. 2 is a schematic wiring diagram of the apparatus for indicating the moisture content of a hydrogen halide-containing halohydrocarbon stream.

As shown in Fig. 1, the electrolytic cell consists of an elongated vertical cylindrical closed steel vessel 3 which also functions as the negative electrode. The vessel is made of a length of steel pipe 4 threaded at the bottom into a reducing fitting 5 having a bottom outlet 6. The top of the vessel is covered by a steel plate 7 welded to the pipe 4. Into the side of the vessel near the top is welded a pipe inlet 8 tangential to the inside wall of the vessel. A carbon rod 9 serving as the positive electrode projects downwardly into the vessel through a stuffing box 10 mounted on the cover and lined with an insulating polytetrafluoroethylene bushing 11. The carbon rod 9 extends axially into the vessel to a distance somewhat below the level of the tangential inlet 8. Attached to the carbon rod 9 and the steel vessel 3 are two electrical terminals 12 and 13 respectively.

As shown in Fig. 2, the electrical terminals 12 and 13 attached to the carbon rod 9 and steel vessel 3 are connected by leads 14 and 15 to a high-resistance millivoltheter 16 having a range of approximately one volt. To allow constant slight discharge of the cell and thus prevent polarization and loss of sensitivity, the leads 14 and 15 are shunted through a resistor 17 (approximately 20,000 ohms). An alarm system is provided consisting of a bell 18 energized from a current source 19 by way of normally open auxiliary contacts 20 built into the millivoltmeter 16, which are closed when the indicating element of the meter reaches a predetermined maximum value.

In using the equipment shown for the determination of moisture in liquid halohydrocarbons, a stream of the liquid is passed continuously into the cell vessel 3 through the tangential inlet 8. The liquid spirals downwardly through the vessel, leaving at the centrally located bottom outlet 6. Due to the swirling action of the stream, the carbon rod 9 and the walls of the cell vessel 3 are maintained clean. The millivoltmeter 16, which may be made recording if desired, constantly indicates the potential developed by the cell. If the predetermined safe value is exceeded, the contacts 20 are closed, actuating the alarm 18. The scale of the millivoltmeter may, for convenience, be calibrated empirically in terms of parts per million of water in the halohydrocarbon.

The apparatus described is effective generally in determining the moisture content of liquid halohydrocarbons containing hydrogen halide. Typical of such liquids are the liquid aliphatic halohydrocarbons produced by the substitution chlorination of alkanes, e. g. crude 1,2-dichloroethane produced by the chlorination of ethane. In normal industrial manufacture, such materials may contain, as impurities to the chloroalkane, small proportions of hydrogen chloride, occasionally traces of dissolved chlorine, and under adverse conditions, water up to its solubility limit. Since these materials become corrosive to steel when about 30 parts per million of water are present, the alarm may be set to operate at the potential corresponding to this value.

The electrolytic cell described undergoes a change of potential with change in water content of the halohydrocarbon, ranging, in the case of 1,2-dichloroethane containing hydrogen chloride, from almost no voltage with carefully dried material up to about 1.0 volt at 100 parts per million of water. The potential appears to be largely independent of other variables, such as the proportion of hydrogen halide or other impurities dissolved in the halohydrocarbon, at least within the normal ranges of these materials in the halohydrocarbon, e. g. in the case of hydrogen chloride, a proportion at least approximating that of the water.

What is claimed is:

The method which comprises: passing a stream of a liquid halohydrocarbon containing hydrogen halide and water associated therewith into simultaneous contact with an iron electrode and a carbon electrode electrically insulated one from the other, and employing the self-developed electrical potential which arises therebetween to actuate an indicating device when said potential exceeds a predetermined value, thereby indicating that the water in said stream has exceeded a predetermined level.

References Cited in the file of this patent

UNITED STATES PATENTS

| | | |
|---|---|---|
| 525,316 | Cassard | Aug. 28, 1894 |
| 1,089,030 | Angell | Mar. 3, 1914 |
| 1,591,286 | Dahlstrum | July 6, 1926 |
| 1,710,535 | Fowler | Apr. 23, 1929 |
| 2,278,248 | Darrah | Mar. 31, 1942 |
| 2,334,790 | Roffy | Nov. 23, 1943 |